United States Patent [19]

Her

[11] Patent Number: 4,854,723
[45] Date of Patent: Aug. 8, 1989

[54] FULL-RANGE TEMPERATURE INDICATOR DEVICE AND CIRCUITRY

[76] Inventor: Fwu-Long Her, No. 13, Kuang Fu Road, Chia Tai Industrial Dist., Tai Pao Hsiang, Chiayi Hsien, Taiwan

[21] Appl. No.: 122,711

[22] Filed: Nov. 18, 1987

[51] Int. Cl.$^4$ .............................................. G01K 7/02
[52] U.S. Cl. .................................. 374/179; 374/173; 374/163
[58] Field of Search ................ 374/163, 170, 173, 179; 340/595

[56] References Cited

U.S. PATENT DOCUMENTS

| | | | |
|---|---|---|---|
| 3,927,571 | 12/1975 | Athey | 340/595 |
| 3,946,364 | 3/1976 | Codomo et al. | 374/170 |
| 4,086,812 | 5/1978 | Luthe et al. | 374/170 |
| 4,115,785 | 9/1978 | Hoopes et al. | 374/179 |
| 4,121,462 | 10/1978 | Mohrman | 374/163 |
| 4,340,886 | 7/1982 | Boldt et al. | 340/595 |
| 4,406,550 | 9/1983 | Gray | 374/179 |
| 4,418,339 | 11/1983 | Spofford, Jr. et al. | 340/595 |
| 4,470,711 | 9/1984 | Brzozowski | 374/179 |
| 4,577,510 | 3/1986 | Bur et al. | 374/179 |
| 4,730,941 | 3/1988 | Levine et al. | 374/170 |

FOREIGN PATENT DOCUMENTS

| | | | |
|---|---|---|---|
| 3318540 | 11/1984 | Fed. Rep. of Germany | 374/170 |
| 0210332 | 11/1984 | Japan | 374/163 |
| 0187830 | 9/1985 | Japan | 374/163 |
| 0047528 | 3/1986 | Japan | 374/170 |
| 0047529 | 3/1986 | Japan | 374/170 |
| 1455503 | 11/1976 | United Kingdom | 374/163 |

*Primary Examiner*—William A. Cuchlinski, Jr.
*Assistant Examiner*—Thomas B. Will
*Attorney, Agent, or Firm*—Browdy & Neimark

[57] ABSTRACT

Full-range temperature indicators used for the display of a temperature scale represented by the number of lamps illuminated based on the temperature of a thermocouple being detected by IC amplifier circuitry, diodes, switching transistors trigger-driven by contacts, illuminating a proper number of indicating lamps for a showing of the detected temperture. Also a particular range of temperature can be preset at upper and lower limits by a rheostat for sequential flashing of the indicating lamps around the limits set.

1 Claim, 2 Drawing Sheets

FULL-RANGE TEMPERATURE INDICATOR DEVICE AND CIRCUITRY

FIELD OF THE INVENTION

A full-range temperature indicator, particularly used for the display of a temperature scale in decimal units represented by the number of illuminated lamps.

BACKGROUND OF THE INVENTION

It is common practice that instrumentation panels adopted for both industrial and educational purposes incorporate frontal displays such as a voltage meter, ammeter, tachometer, and temperature indicators, or the like, to show the operational status of a machine at work, whereby the operator can take control of the overall running conditions of the machine in question, and can respond to switch off the power source as soon as he detects any abnormal condition in the course of operation, so as to maintain the machine in a safe and normal operating condition at all times.

SUMMARY OF THE INVENTION

The present invention is designed in view of correcting the shortcomings found in the use of conventional thermometers of the pointer display type which give readings of the temperature at any given instant as reflected by the pointer moving along the scale. Such shortcomings are:

(a) due to the visual error in observing the deflection of the pointer on the scale, which affects the precision of the readings obtained thereby; and (b) failure of the naked eye to detect the readings on display in gloomy or subdued lighting.

These shortcomings are inevitable with the use of a conventional temperature detection device and can be eliminated by the representation of the temperature reading at any given instant by referring to the number of lamps illuminated as a function of the current temperature in accordance with the present invention.

Accordingly, the primary object of the present invention is to provide a full-range temperature indicator device and circuitry which will eliminate all errors and deviations existing in the use of a conventional pointer-scale type of thermometer, including the inconveniences incurred when taking the temperature readings in dark locations. Instead, the invention provides for an obvious display of temperature reading by referring to the total number of lamps which are illuminated in accordance with the prevailing temperature at any given instant.

The present invention provides a device and circuitry of full-range temperature indicators of a type to comprise uniformly arranged and aligned indicators serving to display a scale of temperature readings indicative of the prevailing temperature in an area or compound being surveyed. The temperature as displayed is a function of the number of lamps illuminated for visual observation.

During a state of increasing heat, there will be constant recycling and flashing produced by pulse signals to keep the operators of the device informed that the device is currently in a state of use and once the temperature reaches a preset level, the indicator will illuminate accordingly. As the temperature drops to a level below the preset level, then heating will take place forthwith concurrent with resumption of recycling of pulse signals as seen by flashing indications, indicative of the setting of the temperature being underway, and also of the heating status quo as well.

BRIEF DESCRIPTION OF THE DRAWINGS

Other features of the invention and means employed to obtain the objects set forth in the foregoing are described in the following text with reference to the accompanying drawings in which.

DETAILED DESCRIPTION OF THE PREFERRED EMBODIMENT

Figure 1:
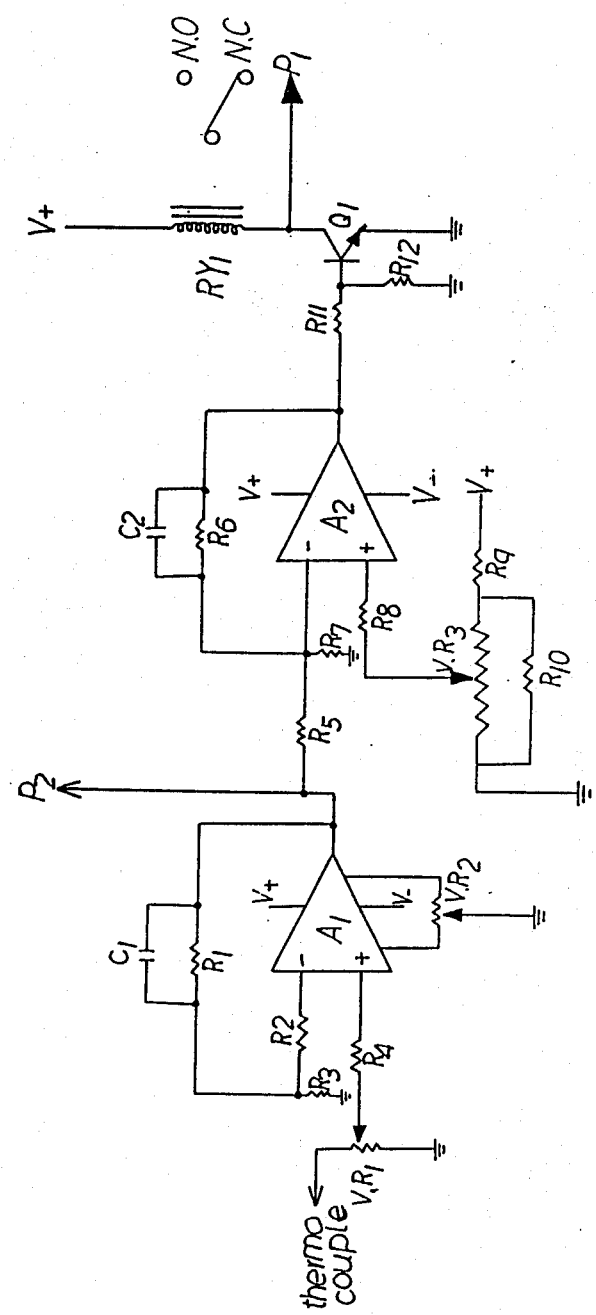
FIG. 1 and FIG. 2 are both schematic diagrams which when combined show circuitry for the present device of full-range temperature indicators.
Figure 2:
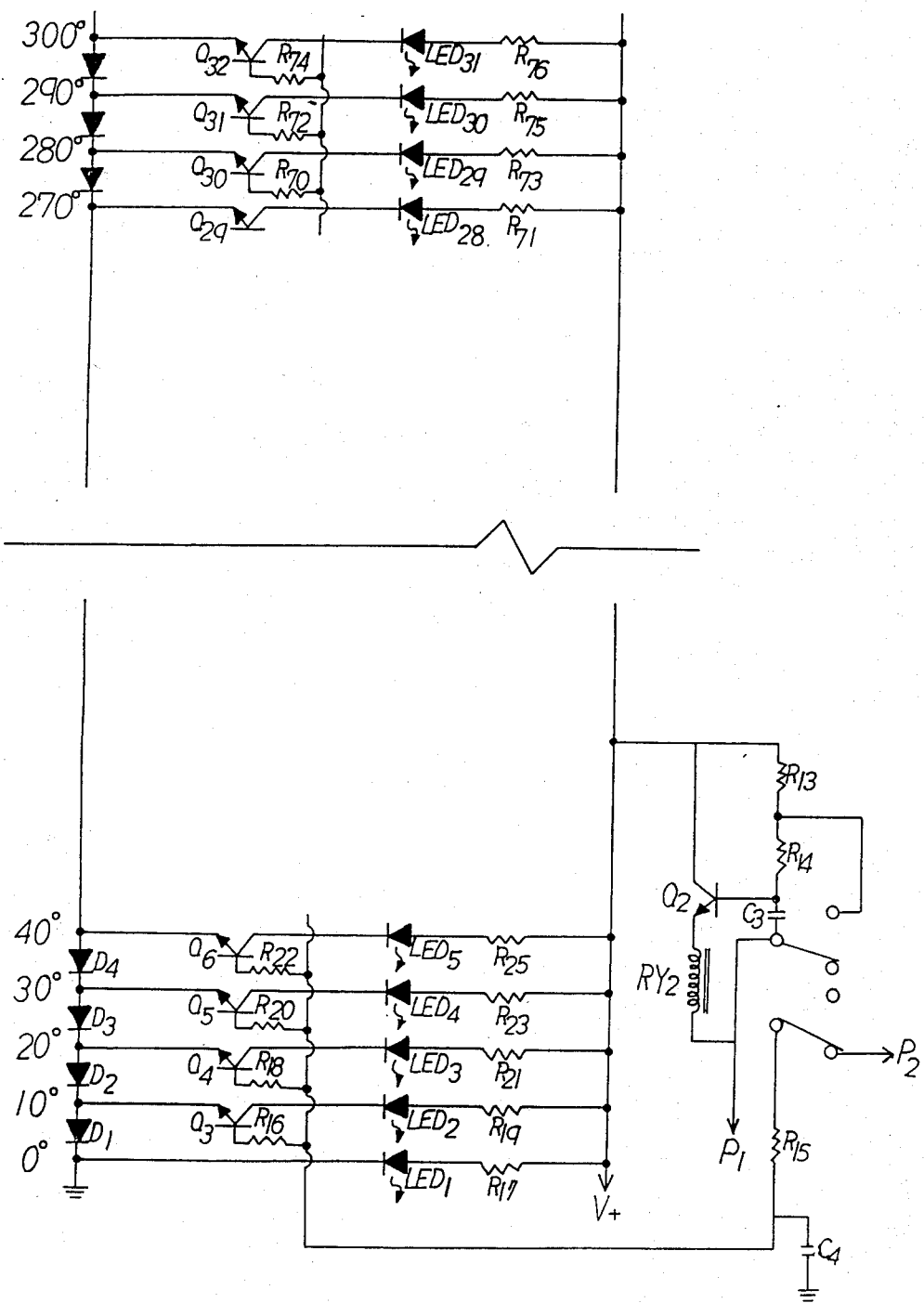

Referring to FIG. 1 and FIG. 2 which figures depict circuitry which connects at P1 and P2, it is seen that IC amplification circuit A1 is driven by heat energy released from a thermocouple. The thermocouple is connected to a positive input of IC amplification circuit A1 whose output is connected to a negative input of IC comparison circuit A2. The negative input of IC amplification circuit A1 is connected by a negative feedback circuit to its output which negative feedback circuit is shown as capacitor C1 and resistor R1 in parallel with capacitor C1 and resistor R3 in series therewith. Resistors R1 and R3 determine the amplification of the amplification circuit while a resistor R2 is used to match the input impedance of IC amplification circuit A1 with the associated circuitry, and improve its linearity.

The positive input of IC comparison circuit A2 is connected to a temperature dependent rheostat VR3. The output of IC comparison circuit A2 is connected to the base of an on-off transistor Q1 whose collector is in series with the coil of relay RY1 and also connected through P1 to relay RY2.

Relay RY1 is used to control output from IC comparison circuit A2 with contact N.O. (normally on) initiating an action and N.C. contact turning off an action by direct activation of an electromagnetic switch.

Relay RY2 is part of an oscillation circuit formed by transistor Q2 and resistors R13 and R14 and condensor C3. This oscillation circuit can be set in the present case for a cycle period of operation of approximately one second. This is done with R13, R14, and C3 forming a charging circuit which brings the voltage of relay RY2 to an "on" state, and C3 discharges through resistor R14. This repetition of charge and discharge constitutes the one second oscillation.

The output of IC amplification circuit A1 is also connected through P2 and through resistor R15 to transistors Q3 through Q32 and thereby to indicator lamps LED 1 through LED 31 which are herein shown as light emitting diodes, and to one way diodes D1–D4 etc. connected to each other in series. The indicator lamp LED 2 has a voltage built up by way of the charging operation of R15, and condenser C4 connected at one end thereof, thus resulting in the flashing of the lamp LED 2 which takes place at one second intervals.

In general in the operation of the device of the present invention, the heat energy released by the thermocouple drives IC amplification circuit A1. A signal from the output connection P2 sends a pulse signal to actuate transistor Q3 to the effect that one-way diode D1, in the absence of shield potential, will collapse and trigger its conduction, whereupon both indicator lamps LED1 and LED2 will light up together to indicate, in this example, that the temperature set for the testing purpose is 10 degrees. The temperature will vary as a function of the temperature of the thermocouple. The magnitude of the AC current may be set by reference to the voltage of the thermocouple, and the induced pulse signal being proportional to the magnitude of the output signal. The relay RY2 serves to control the pulse signal for actuation the drive the indicator lamps.

During the progress of heating up, the indicators will flash and all the indicator lamps LED 1-31 will fully light up once the process of heating has reached a preset temperature with the total illumination of indicator lamps as a result of pulse triggering indicating the temperature of the thermometer in use. This arrangement entirely eliminates such shortcomings as excessive errors occurring as a result of deflection of the pointer on a conventional thermometer and the difficulty of observing test readings in the dark.

Another method recommended for the application of the subject device of the present invention is to set both an upper and lower temperature limit by connecting each of both input ends of the IC comparison circuit A2 to the output end of A1 and to the temperature dependent rheostat VR3 respectively, thereby once the temperature designation at the output end of IC comparison circuit A2 drops to a level below the lower limit predetermined for rheostat VR3, the on-off transistor Q1 will conduct, causing the normally on point N.O. on relay RY1 to set for conduction also, so that the thermocouple will continue building up heat until it reaches the upper limit set for rheostat VR3.

When the heating is in progress, this condition will be indicated by reciprocating flashing of the indicator lamps duly driven by the pulse signal so that an operator can be sure that the device is currently in a heating status. As the heating moves up to a predetermined value the indicator lamps will light up. Heating will resume when the temperature later falls to a point below the predetermined value, concurrent with the resumption of reciprocating flashings of the pulse signals, thereby keeping the device within a prescribed range restricted by both the upper and lower limits set in advance.

I claim:

1. A full-range temperature indicator device and circuitry comprising
    an IC amplification circuit having positive and negative inputs and an output;
    a thermocouple whose temperature is to be detected connected to said positive input of said amplification circuit;
    a feedback circuit including a pair of resistors and a condensor connecting said negative input to said output of said amplification circuit;
    an IC comparison circuit having positive and negative inputs and an output;
    said negative input of said comparison circuit connected to said output of said amplification circuit;
    a temperature dependent rheostat connected to at least said positive input of said comparison circuit;
    a first on-off transistor having a base and a collector;
    said base of said first transistor connected said output of said comparison circuit;
    a first relay connected in series with said collector of said first transistor;
    a plurality of parallel connected LED indicators and a plurality of series connected one-way diodes and a plurality of second transistors, collector of each of said second transistors connected to one of said LED indicators and an emitter of each of said second transistors connected to one of said diodes;
    circuit means to flash designated LED indicators with pulse signals which flashes turn to steady illumination as heating of said thermocouple reaches a set level but which flashes resume as a temperature drop occurs
    whereby a temperature scale of the detected temperature is a function of the number of indicators steadily illuminated, the temperature an any instant being restricted by upper and lower limits determined by said rheostat.

* * * * *